United States Patent
Aizenberg et al.

(10) Patent No.: US 10,265,694 B2
(45) Date of Patent: Apr. 23, 2019

(54) HIGH-SURFACE AREA FUNCTIONAL MATERIAL COATED STRUCTURES

(71) Applicant: President and Fellows of Harvard College, Cambridge, MA (US)

(72) Inventors: Joanna Aizenberg, Boston, MA (US); Tanya Shirman, Arlington, MA (US); Nicolas Vogel, Cambridge, MA (US); Mathias Kolle, Somerville, MA (US); Michael Aizenberg, Boston, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 14/900,567

(22) PCT Filed: Jun. 30, 2014

(86) PCT No.: PCT/US2014/044939
§ 371 (c)(1),
(2) Date: Dec. 21, 2015

(87) PCT Pub. No.: WO2014/210608
PCT Pub. Date: Dec. 31, 2014

(65) Prior Publication Data
US 2016/0144350 A1 May 26, 2016

Related U.S. Application Data

(60) Provisional application No. 61/840,991, filed on Jun. 28, 2013.

(51) Int. Cl.
*B01J 35/10* (2006.01)
*C04B 38/00* (2006.01)
(Continued)

(52) U.S. Cl.
CPC .............. *B01J 35/10* (2013.01); *B01J 23/52* (2013.01); *B01J 37/0018* (2013.01);
(Continued)

(58) Field of Classification Search
CPC ........ B01J 35/10; B01J 23/52; B01J 37/0018; C04B 38/0096; C04B 2111/0081; B82Y 30/00; B82Y 40/00
(Continued)

(56) References Cited

U.S. PATENT DOCUMENTS

| 4,746,468 A | 5/1988 | Ozaki et al. |
| 6,853,760 B2 | 2/2005 | Sekine et al. |

(Continued)

FOREIGN PATENT DOCUMENTS

| WO | WO-2012/078351 A2 | 6/2012 |
| WO | WO-2014/210608 A1 | 12/2014 |

(Continued)

OTHER PUBLICATIONS

"Self-assembly of nanoparticles into structured spherical and network aggregates," Andrew K. Boal et al. Nature, vol. 404, Apr. 2000, pp. 746-748.*

(Continued)

*Primary Examiner* — Patricia L. Hailey
(74) *Attorney, Agent, or Firm* — Wilmer Cutler Pickering Hale and Dorr LLP

(57) ABSTRACT

Methods for forming an interconnected network of solid material and pores, with metal residing only at the air/solid interface of the interconnected network structure are described. In certain embodiments, nanoparticle decorated sacrificial particles can be used as sacrificial templates for the formation of a porous structure having an interconnected network of solid material and interconnected network of pores. The nanoparticles reside predominantly at the air/

(Continued)

solid interface and allow further growth and accessibility of the nanoparticles at defined positions of the interconnected structure. SEM and TEM measurements reveal the formation of 3D interconnected porous structures with nanoparticles residing predominantly at the air/solid interface of the interconnected structure.

8 Claims, 6 Drawing Sheets

(51) Int. Cl.
*B01J 23/52* (2006.01)
*B01J 37/00* (2006.01)
*B82Y 40/00* (2011.01)
*B82Y 30/00* (2011.01)
*C04B 111/00* (2006.01)

(52) U.S. Cl.
CPC ........... *C04B 38/0096* (2013.01); *B82Y 30/00* (2013.01); *B82Y 40/00* (2013.01); *C04B 2111/0081* (2013.01)

(58) Field of Classification Search
USPC .................................. 502/159; 977/882, 883
See application file for complete search history.

(56) References Cited

U.S. PATENT DOCUMENTS

| | | | |
|---|---|---|---|
| 7,373,073 B2 | 5/2008 | Kamp et al. | |
| 7,700,520 B2* | 4/2010 | Chien ..................... | B01J 23/42 502/170 |
| 8,334,014 B1* | 12/2012 | Petsev ................... | C01B 33/124 427/212 |
| 8,389,388 B2 | 3/2013 | Cho et al. | |
| 8,835,003 B2* | 9/2014 | Chen ........................ | B01J 13/20 428/402.24 |
| 8,936,683 B2 | 1/2015 | Marshall | |
| 8,974,993 B2 | 3/2015 | Richards-Johnson et al. | |
| 9,279,771 B2 | 3/2016 | Aizenberg et al. | |
| 2003/0162004 A1 | 8/2003 | Mirkin et al. | |
| 2009/0072222 A1 | 3/2009 | Radisic et al. | |
| 2009/0242839 A1 | 10/2009 | Winkler et al. | |
| 2011/0194304 A1 | 8/2011 | Han et al. | |
| 2011/0311635 A1 | 12/2011 | Stucky et al. | |
| 2011/0312080 A1* | 12/2011 | Hatton .................... | A61L 27/40 435/289.1 |
| 2012/0121820 A1 | 5/2012 | Kaplan et al. | |
| 2012/0238442 A1 | 9/2012 | Lee | |
| 2012/0326104 A1 | 12/2012 | Kwon et al. | |
| 2013/0337257 A1* | 12/2013 | Yano ................... | C04B 38/0041 428/304.4 |
| 2014/0254017 A1 | 9/2014 | Manoharan et al. | |
| 2016/0144350 A1 | 5/2016 | Aizenberg et al. | |

FOREIGN PATENT DOCUMENTS

WO  WO-2017/173306 A1  10/2017
WO  WO-2017/173439 A2  10/2017

OTHER PUBLICATIONS

"Transition metal-doped titania inverse opals: Fabrication and characterizatio," Yi Ma et al. Colloids and Surfaces A: Physicochemical and Engineering Aspects 370 (2010), pp. 129-135.*
Dziomkina et al., "Colloidal crystal assembly on topologically patterned templates," Soft Matter, vol. 1, pp. 265-279, Sep. 12, 2005.
Hatton et al., "Assembly of large-area, highly ordered, crack-free inverse opal films," Proceedings of the National Academy of Sciences, vol. 107, No. 23, pp. 10354-10359, Jun. 8, 2010.
Ryu et al., "Fabrication of Ag nanoparticles-coated macroporous $SiO_2$ structure by using polystyrene spheres," Materials Chemistry and Physics, vol. 101, No. 2-3, pp. 486-491, Jan. 26, 2007.
Stein et al., "Morphological Control in Colloidal Crystal Templating of Inverse Opals, Hierarchical Structures, and Shaped Particles," Chemistry of Materials, vol. 20, No. 3, pp. 649-666, Feb. 1, 2008.
International Search Report and Written Opinion of the International Searching Authority dated Oct. 30, 2014, for International Application No. PCT/US2014/044939 filed Jun. 30, 2014, published on Dec. 31, 2014 as International Publication No. WO/2014210608 A1, 12 pages.
Biener et al., Nanoporous Plasmonic Metamaterials, Adv. Mater. 20:1211-1217, 2008, 7 pages.
Aprile et al., "Enhancement of the photocatalytic activity of TiO2 through spatial structuring and particle size control: from subnanometric to submillimetric length scale," Physical Chemisty Chemical Physics, Feb. 14, 2008, vol. 10, pp. 769-783.
Armstrong et al., "Artificial opal photonic crystals and inverse opal structures — fundamentals and applications from optics to energy storage," Journal of Materials Chemistry C, May 20, 2015, vol. 3, pp. 6109-6143.
Chemseddine et al., "Nanostructuring Titania: Control over Nanocrystal Structure, Size, Shape, and Organization," Eur. J. lnorg. Chem, Jan. 18, 1999, vol. 1999, Issue 2, pp. 235-245.
Chen et al., "A novel green synthesis approach for polymer nanocomposites decorated with silver nanoparticles and their antibacterial activity," Analyst, Nov. 21, 2014, vol. 139, pp. 57935799.
Chen et al., "Creating dynamic Sers hotspots on the surface of pH-responsive microgels for direct detection of crystal violet in solution," Rsc Advances, Jun. 27, 2017, vol. 7, pp. 3274332748.
Chen et al., "Effect of Disorder on the Optically Amplified Photocatalytic Efficiency of Titania Inverse Opals," J. Am. Chem. Soc. Jan. 12, 2007, vol. 129, pp. 1196-1202.
El Baydi et al., "A Sol-Gel Route for the Preparation of Co3O4 Catalyst for Oxygen Electrocatalysis in Alkaline Medium," Journal of Solid State Chemistry, Apr. 1994, vol. 109, pp. 281-288.
Erola et al., "Fabrication of Au- and Ag—SiO2 inverse opals having both localized surface plasmon resonance and Bragg diffraction," Journal of Solid State Chemistry, Oct. 2015, vol. 230, pp. 209-217.
Esposito et al., "Cobalt—silicon mixed oxide nanocomposites by modified sol—gel method," Journal of Solid State Chemistry, Oct. 2007, vol. 180, pp. 3341-3350.
Fetterolf et al., "Adsorption of Methylene Blue and Acid Blue 40 on Titania from Aqueous Solution," Journal of Chemical & Engineering Data, Apr. 29, 2003, vol. 48, pp. 831-835.
Fuhrmann et al., "Diatoms as living photonic crystals," Applied Physics B, Feb. 2004, vol. 78, pp. 257-260.
Garcia et al., "Photonic Glasses: a Step Beyond White Paint," Advanced Materials, published online Aug. 3, 2009, vol. 22, pp. 12-19.
Hatton et al., "Assembly of large-area, highly ordered, crack-free inverse opal films," Proc. Natl. Acad. Sci. Usa, Jun. 8, 2010, vol. 107, No. pages 10354-10359.
He et al., "Chemo-Mechanically Regulated Oscillation of an Enzymatic Reaction," Chemistry of Materials, Feb. 3, 2013, vol. 25, pp. 521-523.
Hou et al., "A Review of Surface Plasmon Resonance-Enhanced Photocatalysis," Advanced Functional Materials, Oct. 30, 2013, vol. 23, pp. 1612-1619.
Hou et al., "Bioinspired molecular co-catalysts bonded to a silicon photocathode for solar hydrogen evolution," Nature Materials, Jun. 2011, vol. 10, pp. 434-438.
Iglesia, "Design, synthesis, and use of cobalt-based Fischer-Tropsch synthesis catalysts," Applied Catalysis a: General, Nov. 4, 1997, vol. 161, pp. 59-78.
International Search Report and Written Opinion mailed Jun. 20, 2017, in the International Application: PCT/US2017/025437, filed Mar. 31, 2017, 17 pp.
International Search Report and Written Opinion mailed May 8, 2018 in International Application no. PCT/US17/25721, filed Apr. 3, 2017, 14 pp.

(56) References Cited

OTHER PUBLICATIONS

Khodakov et al., "Advances in the Development of Novel Cobalt Fischer-Tropsch Catalysts for Synthesis of Long-Chain Hydrocarbons and Clean Fuels," Chemical Reviews, May 9, 2007, vol. 107, pp. 1692-1744.
Laczka et al., "Chromium, cobalt, nickel and copper as pigments of sol-gel glasses," Journal of Alloys and Compounds, Feb. 15, 1995, vol. 218, pp. 77-85.
Li et al. "Improved electrochromic performance in inverse opal vanadium oxide films" Journal of Materials Chemisty, Jul. 22, 2010, vol. 20, pp. 7131-7134.
Li et al., "Colloidal Assembly: the Road from Particles to Colloidal Molecules and Crystals," Angew. Chem. Int. Ed. Engl. Jan. 10, 2011, vol. 50, pp. 360-388.
Li et al., "Crack-free 2D-inverse opal anatase TiO2 films on rigid and flexible transparent conducting substrates: low temperature large area fabrication and electrochromic properties," Journal of Materials Chemistry C, Jul. 23, 2014, vol. 2, Issue 37, pp. 7804-7810.
Liu et al., "A new type of raspberry-like polymer composite sub-microspheres with tunable gold nanoparticles coverage and their enhanced catalytic properties," J. Mater. Chem. A, Oct. 30, 2013, vol. 1, pp. 930-937.
Lu et al., "Atomic layer deposition - Sequential self-limiting surface reactions for advanced catalyst 'bottom-up' synthesis," Surface Science Reports, Jun. 2016, vol. 71, pp. 410-472.
Mohammadi et al., "Nanomaterials engineering for drug delivery: a hybridization approach," Journal of Materials Chemistry B, May 23, 2017, vol. 5, pp. 3995-4018.
Molenbroek et al., "Alloying in Cu/Pd Nanoparticle Catalysts," the Journal of Physical Chemistry B, Dec. 3, 1998, vol. 102, pp. 10680-10689.
Moon et al., "Chemical transformations of nanostructured materials," Nano Today, Apr. 2011, vol. 6, pp. 186-203.
Newton et al., "Anisotropic Diffusion in Face-Centered Cubic Opals," Nano Letters, Apr. 10, 2004, vol. 4, pp. 875-880.
Personick et al., "Catalyst design for enhanced sustainability through fundamental surface chemistry," Philos. Trans. A Math. Phys. Eng. Sci., Feb. 28, 2016, vol. 374, 24 pp.
Qian et al., "A novel approach to raspberry-like particles for superhydrophobic materials," Journal of Materials Chemistry, Jan. 22, 2009, vol. 19, pp. 1297-1304.
Regonini et al., "Effect of heat treatment on the properties and structure of TiO2 nanotubes: phase composition and chemical composition," Surface and Interface Analysis, Mar. 2010, vol. 42, pp. 139-144.
Sanchez et al., "Biomimetism and bioinspiration as tools for the design of innovative materials and systems," Nature Materials, Apr. 2005, vol. 4, pp. 277-288.
Sankar et al., "Designing bimetallic catalysts for a green and sustainable future," Chem. Soc. Rev. Oct. 23, 2012, vol. 41, pp. 8099-8139.
Serp et al,. "Chemical Vapor Deposition Methods for the Controlled Preparation of Supported Catalytic Materials," Chemical Reviews, Aug. 3, 2002, vol. 102, pp. 3085-3128.
Shi et al., "Amorphous Photonic Crystals with Only Short-Range Order," Advanced Materials, Jun. 20, 2013, vol. 25, pp. 5314-5320.
Singleton et al., "Photo-tuning of highly selective wetting in inverse opals," Soft Matter, Mar. 7, 2014, vol. 10, Issue 9, pp. 1325-1328.
Sofo et al., "Diffusion and transport coefficients in synthetic opals," Physical Review B, Jul. 15, 2000, vol. 62, pp. 2780-2785.
Stein et al., "Design and functionality of colloidal-crystal-templated materials—chemical applications of inverse opals," Chem. Soc. Rev. Apr. 7, 2013, vol. 42, pp. 2763-2803.
Sutton et al., "Photothermally triggered actuation of hybrid materials as a new platform for in vitro cell manipulation," Nature Communications, Mar. 13, 2017, vol. 8, No. 14700, 13 pp.
Tian et al., "Design of Raspberry-Shaped Microcarriers with Adjustable Protrusions and Functional Groups for the Improvement of Lipase Immobilization and Biocatalysis: Environmentally Friendly Esterification of Oleic Acid for Biodiesel," ChemCatChem, (2016) vol. 8, p. 2576.
Turkevich et al., "A Study of the Nucleation and Growth Processes in the Synthesis of Colloidal Gold," Discussions of the Faraday Society, Jan. 1951, 11, pp. 55-75.
Vlasov et al., "Different regimes of light localization in a disordered photonic crystal," Physical Review B, Jul. 15, 1999, vol. 60, pp. 1555-1562.
Vogel et al., "Color from hierarchy: Diverse optical properties of micron-sized spherical colloidal assemblies," Pnas, Sep. 1, 2015, vol. 112, pp. 10845-10850.
Vogel et al., "Wafer-Scale Fabrication of Ordered Binary Colloidal Monolayers with Adjustable Stoichiometries," Advanced Functional Materials, vol. 21, Issue 6, published online Jun. 14, 2011, pp. 3064-3073.
Xu et al., "Composite Microspheres for Separation of Plasmid Dna Decorated with MNPs through in Situ Growth or Interfacial Immobilization Followed by Silica Coating," Acs Applied Materials and Interfaces, Sep. 5, 2012, vol. 4, pp. 4764-4775.
Yetisen et al., "Photonic hydrogel sensors," Biotechnology Advances, May-Jun. 2016, vol. 34, pp. 250-271.
Zhang et al. "Enhanced electrochromic performance of highly ordered, macroporous WO3 arrays electrodeposited using polystyrene colloidal crystals as template," Electrochimica Acta, Mar. 2013, vol. 99, pp. 1-8.
Agrawal et al., "Recent developments in fabrication and applications of colloid based composite particles," J. Mater. Chem., first published Oct. 20, 2010, vol. 21, pp. 615-627.
Albrecht et al., "Thermal conductivity of opals and related composites," Physical Review B, Mar. 2001, vol. 63, p. 134303-1 to 134303-8.
An et al., "Nanocatalysis I: Synthesis of Metal and Bimetallic Nanoparticles and Porous Oxides and Their Catalytic Reaction Studies", Catal. Lett., 2015, vol. 145, pp. 233-248.
Anderson et al., "Nanoparticle conversion chemistry: Kirkendall effect, galvanic exchange, and anion exchange", Nanoscale, Nov. 7, 2014, vol. 6, No. 21, pp. 12195-12216.
Argyle et al., "Heterogeneous Catalyst Deactivation and Regeneration: a Review", Catalysts, Feb. 26, 2015, vol. 5, pp. 145-269.
Bacci et al., "Non-destructive spectroscopic detection of cobalt(Ii) in paintings and glass", Studies in Conservation, 1996, vol. 41, No. 3, pp. 136-144.
Biesinger et al., "Resolving surface chemical states in Xps analysis of first row transition metals, oxides and hydroxides: Cr, Mn, Fe, Co and Ni," Applied Surface Science, published online Oct. 20, 2010, vol. 257, pp. 2717-2730.
Burgess et al., "Wetting in Color: Colorimetric Differentiation of Organic Liquids with High Selectivity," Acs Nano (2012), published online Dec. 20 2012, vol. 6, pp. 1427-1437.
Cai et al., "Two-Dimensional Photonic Crystal Chemical and Biomolecular Sensors," Analytical Chemistry, Apr. 13, 2015, vol. 87, pp. 5013-5025.
Campbell, "The Energetics of Supported Metal Nanoparticles: Relationships to Sintering Rates and Catalytic Activity," Accounts of Chemical Research, published online Apr. 22, 2013, vol. 46, pp. 1712-1719.
Cao et al., "Stabilizing metal nanoparticles for heterogeneous catalysis", Physical Chemistry Chemical Physics, 2010, vol. 12, pp. 13499-13510.
Caruso, "Nanoengineering of Particle Surfaces", Advanced Materials, Jan. 5, 2001, vol. 13, No. 1, pp. 11-22.
Chen et al., "Heterogeneous photocatalysis with inverse titania opals: probing structural and photonic effects," Journal of Materials Chemistry, first published online Mar. 17, 2009, vol. 19, pp. 2675-2678.
Cherdhirankorn et al., "Tracer Diffusion in Silica Inverse Opals," Langmuir, published online Mar. 16, 2010, vol. 26, pp. 10141-10146.
Climent et al., "Heterogeneous Catalysis for Tandem Reactions," Acs Catalysis, Jan. 23, 2014, vol. 4, pp. 870-891.

(56) References Cited

OTHER PUBLICATIONS

Corma et al., "Supported gold nanoparticles as catalysts for organic reactions", Chemical Society Reviews, 2008, vol. 37, pp. 2096-2126.
Costa et al., "Synthesis of supported metal nanoparticle catalysts using ligand assisted methods," Nanoscale, Aug. 23, 2012, vol. 4, pp. 5826-5834.
Das et al., "Microgels Loaded with Gold Nanorods: Photothermally Triggered vol. Transitions under Physiological Conditions", Langmuir, 2007, vol. 23, No. 1, pp. 196-201.
Diao et al., "Multiple Structural Coloring of Silk-Fibroin Photonic Crystals and Humidity-Responsive Color Sensing", Advanced Functional Materials, 2013, vol. 23, pp. 5373-5380.
Dick et al., "Size-Dependent Melting of Silica-Encapsulated Gold Nanoparticles", Journal of American Chemical Society, 2002, vol. 124, No. 10, pp. 2312-2317.
Dong et al., "Superhydrophobic polysilsesquioxane/polystyrene microspheres with controllable morphology: from raspberry-like to flower-like structure", Rsc Advances, 2017, vol. 7, pp. 6685-6690.
Du et al., "Facile Fabrication of Raspberry-like Composite Nanoparticles and Their Application as Building Blocks for Constructing Superhydrophilic Coatings," the Journal of Physical Chemistry C, May 28, 2009, vol. 113, p. 9063-9070.
Ennaert et al., "Potential and challenges of zeolite chemistry in the catalytic conversion of biomass," Chem. Soc. Rev., first published Dec. 21, 2015, vol. 45, pp. 584-611.
Fechete et al., "The past, present and future of heterogeneous catalysis," Catalysis Today, published online May 10, 2012, vol. 189, pp. 2-27.
Feinle et al., "Sol—gel synthesis of monolithic materials with hierarchical porosity," Chemical Society Reviews (2016), first published Nov. 13, 2015, vol. 45, pp. 3377-3399.
Ferrando et al., "Nanoalloys: From Theory to Applications of Alloy Clusters and Nanoparticles", Chemical Reviews, 2008, vol. 108, No. 3, pp. 845-910.
Francesco et al., "Synergy in the Catalytic Activity of Bimetallic Nanoparticles and New Synthetic Methods for the Preparation of Fine Chemicals", ChemCatChem Minireviews, published online Aug. 19, 2014, vol. 6, pp. 2784-2791.
Gao et al., "Stimuli-responsive microgel-based etalons for optical sensing", Rsc Advances, 2015. vol. 5, pp. 44074-44087.
Garcia et al., "Photonic crystals with controlled disorder," Physical Review a, Aug. 10, 2011, vol. 84, pp. 023813-1 to 023813-7.
Garcia et al., "Photonic Glass: a Novel Random Material for Light," Advanced Materials, Aug. 9, 2007, vol. 19, pp. 2597-2602.
Girardon et al., "Effect of cobalt precursor and pretreatment conditions on the structure and catalytic performance of cobalt silica-supported Fischer-Tropsch catalysts," Journal of Catalysis, Mar. 10, 2005, vol. 230, pp. 339-352.
Gonzalez-Delgado, et al. "Control of the Lateral Organization in Langmuir Monolayers via Molecular Aggregation of Dyes," the Journal of Physical Chemistry C, Oct. 7, 2010, vol. 114, pp. 16685-16695.
Govorov et al., "Gold nanoparticle ensembles as heaters and actuators: melting and collective plasmon resonances," Nanoscale Research Letters, Jul. 26, 2006, vol. 1, pp. 84-90.
Grabar et al., "Two-Dimensional Arrays of Colloidal Gold Particles: a Flexible Approach to Macroscopic Metal Surfaces," Langmuir, May 15, 1996, vol. 12, pp. 2353-2361.
Griffete et al., "Inverse Opals of Molecularly Imprinted Hydrogels for the Detection of Bisphenol a and pH Sensing", Langmuir, Nov. 16, 2011, vol. 28, pp. 1005-1012.
Guerrero-Martinez et al., "Recent Progress on Silica Coating of Nanoparticles and Related Nanomaterials," Advanced Materials, Jan. 4, 2010, vol. 22, pp. 1182-1195.
Hall et al., "Mesostructure-Induced Selectivity in CO2 Reduction Catalysis", Journal of the American Chemical Society, Nov. 4, 2015, vol. 137, pp. 14834-14837.

Han et al., "Selective oxidation of methanol to methyl formate on catalysts of Au-Ag alloy nanoparticles supported on titania under Uv irradiation," Green Chemistry, May 19, 2014, vol. 16, pp. 3603-3615.
Hansen et al., "Sintering of Catalytic Nanoparticles: Particle Migration or Ostwald Ripening?", Accounts of Chemical Research, 2013, vol. 46, No. 8, pp. 1720-1730.
Hartmann, et al., "Catalytic test reactions for the evaluation of hierarchical zeolites," Chem. Soc. Rev. Mar. 17, 2016, vol. 45, pp. 3313-3330.
Heveling, "Heterogeneous Catalytic Chemistry by Example of Industrial Applications", Journal of Chemical Education, Oct. 9, 2012, vol. 89, pp. 1530-1536.
Huang et al., "High-performance heterogeneous catalysis with surface-exposed stable metal nanoparticles", Scientific Reports, Nov. 27, 2014, vol. 4, p. 7228 (8 pp.).
Huang et al., "Self-Assembly of Multi-nanozymes to Mimic an Intracellular Antioxidant Defense System," Angew. Chem. Int. Ed. Engl., Apr. 21, 2016, vol. 55, pp. 6646-6650.
Hunt et al., "Elemental Sustainability for Catalysis," Chapter 1 from: Sustainable Catalysis: With Non-endangered Metals, Part 1, Royal Society of Chemistry, Nov. 16, 2015, pp. 1-14.
Ibisate et al., "Silicon Direct Opals," Advanced Materials, May 7, 2009, vol. 21, pp. 2899-2902.
Jarosz et al., "Heat Treatment Effect on Crystalline Structure and Photoelectrochemical Properties of Anodic TiO2 Nanotube Arrays Formed in Ethylene Glycol and Glycerol Based Electrolytes", J. Phys. Chem. C, Oct. 5, 2015, vol. 119, pp. 24182-24191.
Jellinek, "Nanoalloys: tuning properties and characteristics through size and composition", Faraday Discussions, 2008, vol. 138, pp. 11-35.
Karg et al., "Nanorod-Coated Pnipam Microgels: Thermoresponsive Optical Properties", Small, 2007, vol. 3, No. 7, pp. 1222-1229.
Keita et al., "Synthesis of remarkably stabilized metal nanostructures using polyoxometalates", Journal of Materials Chemistry, 2009, vol. 19, pp. 19-33.
Kessler et al., "New insight in the role of modifying ligands in the sol-gel processing of metal alkoxide precursors: a possibility to approach new classes of materials", J. Sol-Gel Sci Techn, 2006, vol. 40, pp. 163-179.
Kim et al., "Silk protein based hybrid photonic-plasmonic crystal," Optics Express, published Apr. 3, 2013, vol. 21, pp. 8897-8903.
Koay et al., "Hierarchical structural control of visual properties in self-assembled photonic-plasmonic pigments", Optics Express, Nov. 3, 2014, vol. 22, No. 23, pp. 27750-27768.
Lange, "Renewable Feedstocks: the Problem of Catalyst Deactivation and its Mitigation," Angew. Chem. Int. Ed. Engl., Oct. 12, 2015, vol. 54, 13186-13197.
Le Beulze et al., "Robust raspberry-like metallo-dielectric nanoclusters of critical sizes as Sers substrates," Nanoscale, Apr. 11, 2017, vol. 9, pp. 5725-5736.
Lee et al., "Facile fabrication of sub-100 nm mesoscale inverse opal films and their application in dye-sensitized solar cell electrodes," Scientific Reports, Oct. 28, 2014, vol. 4: 6804, 7 pp.
Lee et al., "Monolayer Co3O4 Inverse Opals as Multifunctional Sensors for Volatile Organic Compounds", Chemistry - a European Journal, published online Apr. 29, 2016, vol. 22, pp. 7102-7107.
Lee et al., "Rapid Hydrolysis of Organophosphorous Esters Induced by Nanostructured, Fluorine-Doped Titania Replicas of Diatom Frustules," Journal of the American Ceramic Society, May 10, 2007, vol. 90, pp. 1632-1636.
Li et al. "The forces at work in colloidal self-assembly: a review on fundamental interactions between colloidal particles," Asia-Pacific Journal of Chemical Engineering, Jul. 17, 2008, vol. 3, pp. 255-268.
Li et al., "Facile and Controlled Fabrication of Functional Gold Nanoparticle-coated Polystyrene Composite Particle," Macromolecular Rapid Communications, Nov. 1, 2011, vol. 32, pp. 1741-1747.
Li et al., "Silica-supported Au-Cu alloy nanoparticles as an efficient catalyst for selective oxidation of alcohols," Applied Catalysis a: General May 19, 2012, vol. 433-434, pp. 146-151.
Linic, et al., "Plasmonic-metal nanostructures for efficient conversion of solar to chemical energy," Nature Materials, published online Nov. 23, 2011, vol. 10, p. 911-921.

(56) References Cited

OTHER PUBLICATIONS

Liu et al., "From Galvanic to Anti-Galvanic Synthesis of Bimetallic Nanoparticles and Applications in Catalysis, Sensing, and Materials Science," Advanced Materials, Jan. 27, 2017, vol. 29, 16 pages.
Liu et al., "Slow Photons for Photocatalysis and Photovoltaics", Advanced Materials, 2017, vol. 29, p. 1605349 (21 pages).
Livage et al., "Sol-Gel Chemistry of Transition Metal Oxides", Prog. Solid St. Chem., 1988, vol. pp. 259-341.
Long, et al., "Oxidative etching for controlled synthesis of metal nanocrystals: atomic addition and subtraction," Chem. Soc. Rev., Sep. 7, 2014, vol. 43, pp. 6288-6310.
Lytle et al., "Multistep, Low-Temperature Pseudomorphic Transformations of Nanostructured Silica to Titania via a Titanium Oxyfluoride Intermediate", Chem. Mater., 2004, vol. 16, No. 20, pp. 3829-3837.
Mason, "The Electronic Spectroscopy of Dyes," Journal of the Society of Dyers and Colourists, Dec. 1968, vol. 84, pp. 604-612.
Ming et al., "Superhydrophobic Films from Raspberry-like Particles", Nano Letters, Oct. 1, 2005, vol. 5, No. 11, pp. 2298-2301.
Munnik et al., "Recent Developments in the Synthesis of Supported Catalysts," Chem. Rev., Jun. 2015, vol. 115, pp. 6687-6718.
Nguyen et al., "Looking for Synergies in Molecular Plasmonics through Hybrid Thermoresponsive Nanostructures", Chemistry of Materials, May 10, 2016, vol. 28, pp. 3564-3577.
Oldenburg et al., "Nanoengineering of optical resonances", Chemical Physics Letters, May 22, 1998, vol. 288, pp. 243-247.
Olguin et al., "Tailoring the oxidation state of cobalt through halide functionality in sol-gel silica," Scientific Reports, Aug. 15, 2013, vol. 3: 2449, 5 pp.
Parlett et al., "Spatially orthogonal chemical functionalization of a hierarchical pore network for catalytic cascade reactions", Nature Materials, Feb. 2016, vol. 15, pp. 178-182 (7 pp.).
Person ick et al., "Ozone-Activated Nanoporous Gold: a Stable and Storable Material for Catalytic Oxidation," Acs Catalysis, May 28, 2015, vol. 5, pp. 4237-4241.
Phillips et al., "Tunable Anisotropy in Inverse Opals and Emerging Optical Properties," Chemistry of Materials, Jan. 28, 2014, vol. 26, pp. 1622-1628.
Prati et al., "The Art of Manufacturing Gold Catalysts," Catalysts, Dec. 21, 2011, vol. 2, pp. 24-37.
Qian et al., "Raspberry-like Metamolecules Exhibiting Strong Magnetic Resonances," Acs Nano, Jan. 26, 2015, vol. 9, pp. 1263-1270.
Reisfeld et al., "Irreversible Spectral Changes of Cobalt(II) by Moderate Heating in Sol-Gel Glasses, and their Ligand Field Rationalization", Chemical Physics Letters, Dec. 8, 1989, vol. 164, No. 2,3, pp. 307-312.
Ren et al., "Ordered mesoporous metal oxides: synthesis and applications," Chem. Soc. Rev., May 31, 2012, vol. 41, pp. 4909-4927.
Richman et al., "Ordered Mesoporous Silicon through Magnesium Reduction of Polymer Templated Silica Thin Films," Nano Letters, Aug. 15, 2008, vol. 8, pp. 3075-3079.
Sachse et al., "Surfactant-Templating of Zeolites: From Design to Application", Chemistry of Materials, Apr. 4, 2017, vol. 29, pp. 3827-3853.
Saib et al., "Silica supported cobalt Fischer-Tropsch catalysts: effect of pore diameter of support," Catalysis Today, Jan. 15, 2002, vol. 71, pp. 395-402.
Sandhage et al., "Merging Biological Self-Assembly with Synthetic Chemical Tailoring: the Potential for 3-D Genetically Engineered Micro/Nano-Devices (3-D Gems)", International Journal of Applied Ceramic Technology, 2005, vol. 2, No. 4, pp. 317-326.
Sandhage et al., "Novel, Bioclastic Route to Self-Assembled, 3D, Chemically Tailored Meso/Nanostructures: Shape-Preserving Reactive Conversion of Biosilica (Diatom) Microshells", Advanced Materials, Mar. 18, 2002, vol. 14, No. 6, pp. 429-433.
Sandhage, "Materials "Alchemy": Shape-Preserving Chemical Transformation of Micro-to-Macroscopic 3-D Structures", Jom, Jun. 2010, vol. 62, No. 6, pp. 32-43.
Schauermann et al., "Nanoparticles for Heterogeneous Catalysis: New Mechanistic Insights", Accounts of Chemical Research, 2013, vol. 46, No. 8, pp. 1673-1681.
Schneider et al., "Understanding TiO2 Photocatalysis: Mechanisms and Materials," Chemical Reviews, Sep. 19, 2014, vol. 114, pp. 9919-9986.
Schultz et al., "From Molecular Diversity to Catalysis: Lessons from the Immune System," Science, Sep. 29, 1995, vol. 269, pp. 1835-1842.
Schwieger et al., "Hierarchy concepts: classification and preparation strategies for zeolite containing materials with hierarchical porosity", Chem. Soc. Rev., Jun. 21, 2016, vol. 45, pp. 3353-3376.
Shepherd et al., "Stop-Flow Lithography of Colloidal, Glass, and Silicon Microcomponents", Advanced Materials, 2008, vol. 20, pp. 4734-4739.
Shi et al., "Gold Nanoshells on Polystyrene Cores for Control of Surface Plasmon Resonance," Langmuir Jan. 15, 2005, vol. 21, pp. 1610-1617.
Shi et al., "Recent advances of pore system construction in zeolite-catalyzed chemical industry processes," Chem. Soc. Rev., Nov. 16, 2015, vol. 44, pp. 8877-8903.
Shi et al., "Recent progress on upgrading of bio-oil to hydrocarbons over metal/zeolite bifunctional catalysts," Catalysis Science & Technology, May 3, 2017, vol. 7, 2385-2415.
Shirman et al., "New Architectures for Designated Catalysts: Selective Oxidation using AgAu Nanoparticles on Colloid-Templated Silica", Chemistry - a European Journal, 2018, vol. 24, pp. 1833-1837.
Singh et al., "Synergistic Catalysis over Bimetallic Alloy Nanoparticles", ChemCatChem Reviews, 2013, vol. 5, pp. 652-676.
Surnev et al., "Structure-Property Relationship and Chemical Aspects of Oxide-Metal Hybrid Nanostructures", Chemical Reviews, Dec. 13, 2012, vol. 113, pp. 4314-4372.
Takeoka, "Stimuli-responsive opals: colloidal crystals and colloidal amorphous arrays for use in functional structurally colored materials", J. Mater. Chem. C, Oct. 14, 2013, vol. 1, No. 38, pp. 6059-6074.
Telford et al., "Mimicking the Wettability of the Rose Petal using Self-assembly of Waterborne Polymer Particles", Chemistry of Materials, Jul. 23, 2013, vol. 25, pp. 3472-3479.
Tian et al., "Monodisperse raspberry-like multihollow polymer/Ag nanocomposite microspheres for rapid catalytic degradation of methylene blue", Journal of Colloid and Interface Science, 2017, vol. 491, pp. 294-304.
Trogadas et al., "Nature-inspired optimization of hierarchical porous media for catalytic and separation processes", New J. Chem., 2016, vol. 40, pp. 4016-4026.
Tetreault et al., "High-Efficiency Dye-Sensitized Solar Cell with Three-Dimensional Photoanode", Nano Letters, Sep. 30, 2011, vol. 11, pp. 4579-4584.
Vasquez et al., "Three-Phase Co-assembly: in Situ Incorporation of Nanoparticles into Tunable, Highly Ordered, Porous Silica Films," Acs Photonics, published online Nov. 1, 2013, vol. 1, pp. 53-60.
Wang et al., "New Polymer Colloidal and Carbon Nanospheres: Stabilizing Ultrasmall Metal Nanoparticles for Solvent-Free Catalysis", Chemistry of Materials, Apr. 18, 2017, vol. 29, pp. 4044-4051.
Xia et al., "Freestanding Co3O4 nanowire array for high performance supercapacitors," Rsc Advances Jan. 4, 2012, vol. 2, pp. 1835-1841.
Xie, et al., "Temperature-Controlled Diffusion in Pnipam-Modified Silica Inverse Opals," Acs Macro Letters, Jan. 15, 2016, vol. 5, pp. 190-194.
Yang et al., "Hierarchical TiO2 photonic crystal spheres prepared by spray drying for highly efficient photocatalysis", Journal of Materials Chemistry a, 2013, vol. 1, pp. 541-547.
Yang et al., "Synthesis of replica mesostructures by the nanocasting strategy" Journal of Materials Chemistry, 2005, vol. 15, pp. 1217-1231.
Yoon et al., "Multifunctional polymer particles with distinct compartments", Journal of Materials Chemistry, 2011, vol. 21, pp. 8502-8510.

(56) References Cited

OTHER PUBLICATIONS

Yoon et al., "Tuning of Silver Catalyst Mesostructure Promotes Selective Carbon Dioxide Conversion into Fuels," Angewandte Chemie, published online Nov. 10, 2016, vol. 128, pp. 15508-15512.

Zhang et al., "Reprogrammable Logic Gate and Logic Circuit Based on Multistimuli-Responsive Raspberry-like Micromotors," Acs Applied Materials & Interfaces, May 30, 2016, vol. 8, 15654-15660.

Zhang et al., "Size and composition tunable Ag-Au alloy nanoparticles by replacement reactions", Nanotechnology, May 18, 2007, vol. 18, p. 245605 (9 pages).

Zhou et al., "Surface plasmon resonance-mediated photocatalysis by noble metal-based composites under visible light", Journal of Materials Chemistry, 2012, vol. 22, pp. 21337-21354.

International Search Report and Written Opinion dated Feb. 5, 2019, in the International Application No. PCT/US18/53822, 20 pages.

Shastri et al., "An aptamer-functionalized chemomechanically modulated biomolecule catch-and-release system," Nature Chemistry, published online Mar. 23, 2015, DOI: 10.1038/NCHEM.2203. 8 pages.

\* cited by examiner

HIGH-SURFACE AREA FUNCTIONAL MATERIAL COATED STRUCTURES

This invention was made with government support under FA9550-09-1-0669-DOD35CAP awarded by the U. S. Air Force. The government has certain rights in the invention.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

CROSS-REFERENCES TO RELATED APPLICATIONS

This patent application claims the benefit of the earlier filing date of International Patent Application No. PCT/US2014/044939, filed on Jun. 30, 2014, which claims the benefit of U.S. Patent Application No. 61/840,991, filed on Jun. 28, 2013, the contents of which are incorporated by reference herein in its entirety.

INCORPORATION BY REFERENCE

All patents, patent applications and publications cited herein are hereby incorporated by reference in their entirety in order to more fully describe the state of the art as known to those skilled therein as of the date of the invention described herein.

FIELD OF THE INVENTION

The present application relates to high surface area structures coated with functional material. More particularly, the present application relates to high surface area structures coated with functional materials that may be useful in applications, such as catalytic, optical, antibacterial, sensing and the like applications.

BACKGROUND

Many different applications employ the use of functional material. Generally, this functional material needs to contact the material of interest (e.g., reactants, analytes, etc.) to be active. Particularly, if a solid support was desired, the functional materials were added to the solid support, but many remained inaccessible due to the fact that most were embedded into the solid support material fully encasing the functional material or were not in an active enough state due to other reasons (agglomeration, change in chemical state, or both).

SUMMARY

In certain embodiments, the present disclosure is directed to a method for fabricating a porous structure. The method includes attaching of one or more nanometer sized functional material to the surface of sacrificial particles to obtain nanomaterial-modified sacrificial particles, wherein said plurality of nanometer sized functional material have a size that is less than 7.75% of the characteristic size of the sacrificial particles; arranging the nanomaterial-modified sacrificial particles into an assembly containing an arrangement of nanomaterial-modified sacrificial particles having an interconnected interstitial space of pores between said nanomaterial-modified sacrificial particles; filling the assembly with a material that fills the interconnected interstitial space of pores; and removing the sacrificial particles to form an interconnected porous network structure comprising an interconnected network of solid material defining an interconnected network of pores; wherein the one or more nanometer sized functional material reside predominantly on the surfaces of the interconnected network of solid material defining an interconnected network of pores.

In certain embodiments, the sacrificial particles include colloidal particles.

In certain embodiments, the interconnected porous network structure has a porosity that is greater than 50%.

In certain embodiments, the one or more nanometer sized functional material are selected from the group consisting gold, palladium, platinum, silver, copper, rhodium, ruthenium, rhenium, osmium, iridium, iron, cobalt, nickel and combinations thereof.

In certain embodiments, the one or more nanometer sized functional material are selected from the group consisting of silicon, germanium, tin, silicon doped with group III or V elements, germanium doped with group III or V elements, tin doped with group III or V elements, and combinations thereof.

In certain embodiments, the one or more nanometer sized functional material are selected from the group consisting of beryllia, silica, alumina, noble metal oxides, platinum group metal oxides, titania, zirconia, hafnia, molybdenum oxides, tungsten oxides, rhenium oxides, tantalum oxide, niobium oxide, vanadium oxides, chromium oxides, scandium, yttrium, lanthanum and rare earth oxides, thorium, uranium oxides and combinations thereof.

In certain embodiments, the one or more nanometer sized functional material comprise mixed metal oxides (HMOs), containing alkaline, alkaline earth, rare earth and noble and other metals, heteropolyacids or combinations thereof.

In certain embodiments, the one or more nanometer sized functional material are selected from the group consisting of pure and mixed metal sulfides, other chalcogenides, nitrides, other pnictides and mixtures thereof.

In certain embodiments, the one or more nanometer sized functional material include catalysts for chemical reactions.

In certain embodiments, the interconnected network of solid material is a crystalline inverse opal structure.

In certain embodiments, the interconnected network of solid material is a disordered interconnected structure.

In certain embodiments, the solid material is selected from the group consisting of alumina, silica, titania, inorganic sol-gel derived oxides, polymers, random copolymers, block copolymers, dendritic polymers, supramolecular polymers, metals and combinations thereof.

In certain embodiments, the sacrificial particles are selected from the group consisting of polystyrene (PS) colloidal particles, silica particles, acrylate particles, alkylacrylate particles, substituted alkylacrylate particles, poly(divinylbenzene) particles, polymers, random copolymers, block copolymers, dendritic polymers, supramolecular polymers, and combinations thereof.

In certain embodiments, the method further includes: providing a growth solution to form a continuous shell residing predominantly at the interface between said network of solid material and said network of pores.

In certain embodiments, the method further includes: providing a growth solution to grow said one or more nanometer sized functional material attached to the surface of sacrificial particles.

In certain embodiments, the growth of the one or more nanometer sized functional material forms a nanoshell.

In certain embodiments, the arranging and the filling are carried out simultaneously.

In certain embodiments, the arranging and the filling are carried out using emulsion templating.

In certain embodiments, the method further includes: providing additional functional material to the one or more nanometer sized functional material that reside predominantly at the interface between said interconnected network of solid material and said interconnected network of pores.

In certain embodiments, the present disclosure is directed to an interconnected porous network structure that includes an interconnected network of solid material defining an interconnected network of pores, wherein the interconnected solid material has a crystalline inverse opal structure; and nanoparticles residing predominantly on the surfaces of said interconnected network of solid material defining an interconnected network of pores.

In certain embodiments, the nanoparticles are selected from the group consisting of metal nanoparticles, semiconductor nanoparticles, metal oxide nanoparticles, mixed metal oxide nanoparticles, metal sulfide nanoparticles, metal chalcogenide nanoparticles, metal nitride nanoparticles, metal pnictide nanoparticles and combinations thereof.

In certain embodiments, the nanoparticles are selected from the group consisting of gold, palladium, platinum, silver, copper, rhodium, ruthenium, rhenium, osmium, iridium, iron, cobalt, nickel and combinations thereof.

In certain embodiments, the nanoparticles are selected from the group consisting of silicon, germanium, tin, silicon doped with group III or V elements, germanium doped with group III or V elements, tin doped with group III or V elements, and combinations thereof.

In certain embodiments, the nanoparticles include catalysts for chemical reactions.

In certain embodiments, the nanoparticles are selected from the group consisting of silica, alumina, beryllia, noble metal oxides, platinum group metal oxides, titania, zirconia, hafnia, molybdenum oxides, tungsten oxides, rhenium oxides, tantalum oxide, niobium oxide, chromium oxides, scandium, yttrium, lanthanum, ceria, and rare earth oxides, thorium and uranium oxides and combinations thereof.

In certain embodiments, the solid material is selected from the group consisting of silica, titania, alumina, zirconia, hafnia, inorganic sol-gel derived oxides, polymers, random copolymers, block copolymers, branched polymers, star polymers, dendritic polymers, supramolecular polymers, metals and combinations thereof.

In certain embodiments, the nanoparticles are grown in size up to and including to form a continuous shell residing predominantly at the interface between said network of solid material and said network of pores.

BRIEF DESCRIPTION OF THE DRAWINGS

The objects and advantages will be apparent upon consideration of the following detailed description, taken in conjunction with the accompanying drawings, in which like reference characters refer to like parts throughout, and in which.

DETAILED DESCRIPTION

The three dimensional (3D) interconnected porous structures, synthesized from a sacrificial template assembly, provide a high degree of interconnected pores having a high surface area with well-defined pore size and accessibility of a porous network. Such structures are potential candidates for applications in sensing and catalysis. The incorporation of functional nanoparticles into interconnected porous structure can introduce certain desired properties, such as optical, sensing and catalytic properties. Typically, such particles are incorporated by the infiltration of the preformed porous network with the solution containing nanoparticles (e.g., metal particles) or by a three-phase co-assembly deposition, simultaneously assembling polymer colloids, a matrix material (e.g. silica) and nanoparticles. In the former, low surface density and poor interface adhesion of nanoparticles is observed; in the latter, many of the nanoparticles remain completely embedded within the matrix material and a high degree of loading was needed to provide access to the nanoparticles so that some small fraction of the metal nanoparticles can sit at the air/solid interface.

The present application provides a precise control over nanoparticles distribution onto the surfaces of a network of interconnected solid material defining an interconnected network of pores, such as, for example, inverse opals structures. In particular, metal nanoparticles can be placed at the air/solid interface of the network of interconnected solid material defining an interconnected network of pores, resulting in a higher accessibility of nanoparticles and enormously enhancing their effective utilization as catalysts, sensors, and surface-enhanced Raman spectroscopy (SERS) substrates.

As used herein, an "interconnected structure" refers to a structure that has at least two different continuous phases. An "interconnected porous network structure" refers to a structure that has at least one continuous pore phase and at least one continuous solid material phase.

In certain embodiments, the interconnected porous network structure has a porosity that is greater than 70 vol % approaching cubic closed packed structures (e.g., 74%). In certain embodiments, the interconnected porous network structure has a porosity that is greater than 50 or 53 vol % as in cubic or hexagonal or random structures. In certain embodiments, the porosity is greater than 80% or more than 90% (e.g., by utilizing mesoporous silica that provides even greater porosity within the solid material). In certain embodiments, the interconnected porous network structure has a well-defined pore size that varies less than 5% with respect to the pore diameters.

Figure 1:
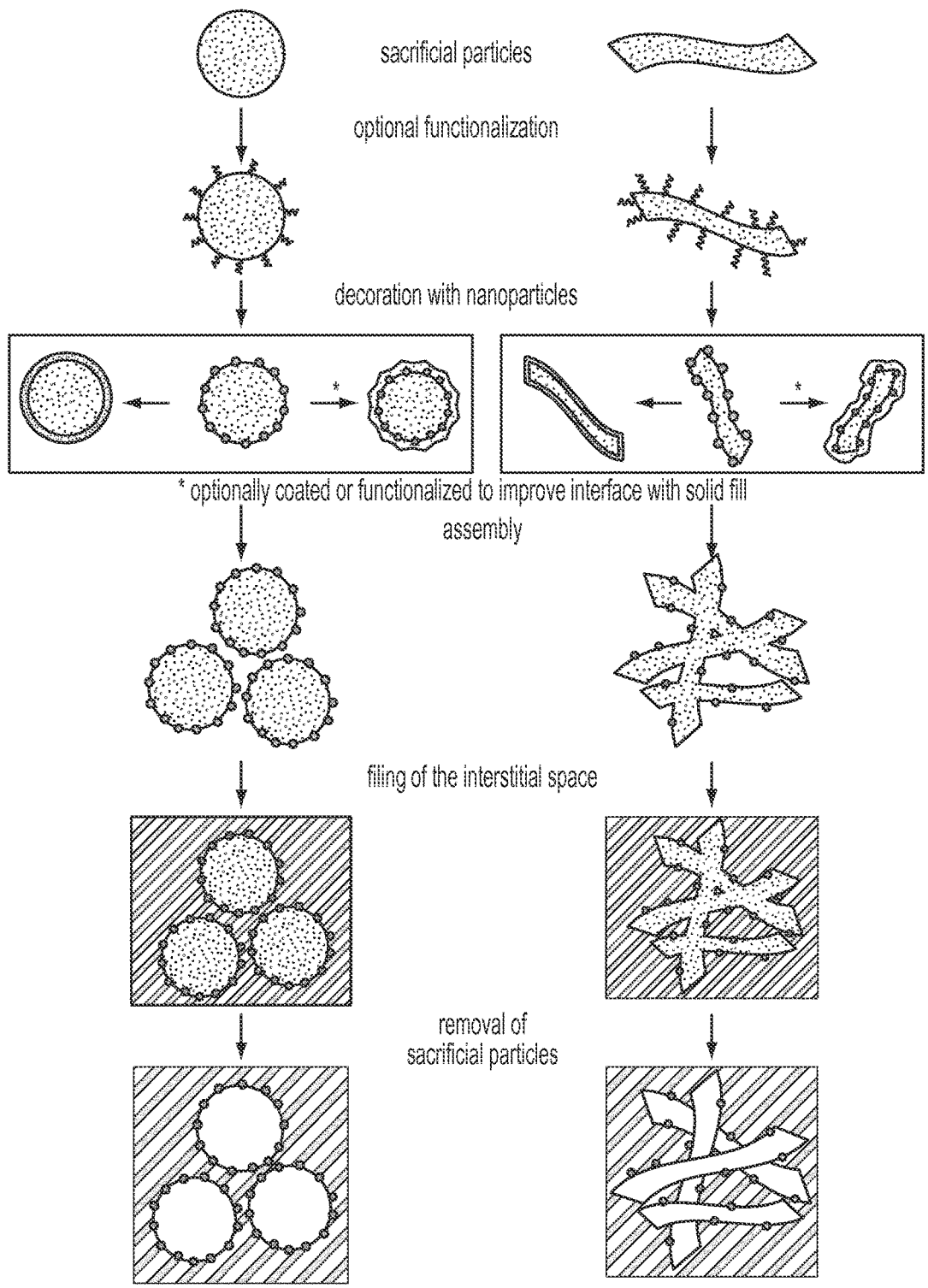
FIG. 1 is a schematic illustration showing a method for forming interconnected porous network structure having nanoparticles residing only at the air/solid interface in accordance with certain embodiments.

FIG. 1 shows a schematic illustration for placing nanoparticles predominantly on the surface of the continuous solid (i.e., predominantly at the air-solid interface of an interconnected porous network structure). As shown in FIG. 1, sacrificial particles can be provided, where they may already have or can be optionally provided with functional groups that can adhere to nanoparticles. As shown, the sacrificial particle can be any shape, such as spherical or random. Other shapes of the sacrificial particles will be readily apparent to one skilled in the art.

Figure 2:
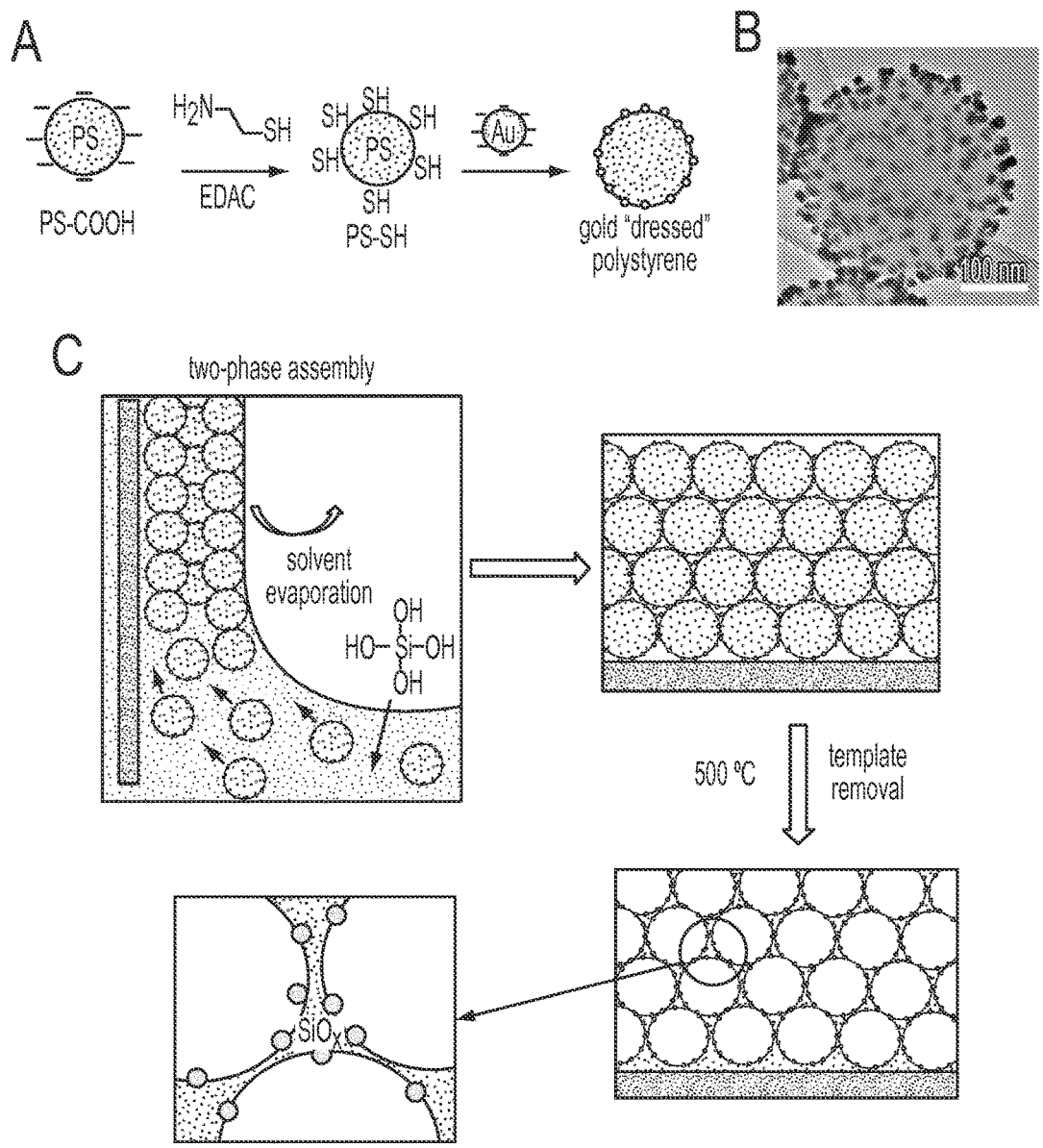
FIG. 2A-2C is an example of using a spherical colloidal particle as sacrificial particle and using co-assembly method to form an interconnected porous network structure having nanoparticles residing only at the air/solid interface in accordance with certain embodiments.

FIG. 2A shows one particular example where spherical colloidal particles (e.g. polystyrene "PS") bearing functional groups that can adhere to nanoparticles can be formed. The schematic in FIG. 2A provides one illustrative example where the PS surfaces are functionalized with carboxylic groups, followed by their modification with 2-aminoethanethiol to introduce thiol functionalities to the colloid surface.

Subsequently, as shown in FIG. 1, the nanoparticles can be attached to the surfaces of the sacrificial particles. In certain embodiments, the sacrificial particles can be modified on their surfaces with one or more functional materials using various binding mechanisms depending on the type of material to be attached, such as covalent attachment (e.g., metal nanoparticle attachment through thiol chemistry), dative bonding (e.g., complexation with a wide range of inorganic or organic ligands or via organometallic moieties) or electrostatic attraction between opposite-charged colloids and nanoparticles. FIG. 2A shows a particular example where polystyrene (PS) colloidal particle is used as the sacrificial particle and gold nanoparticles are covalently attached to the colloidal surface (e.g., PS) through the functional groups (e.g., thiol moiety).

FIG. 2B shows one exemplary polystyrene (PS) colloidal particle that has nanoparticles attached thereon through Au—S covalent bonding. In FIG. 2B, the gold nanoparticles have an average diameter of about 12 nm and the PS colloidal particles have an average diameter of about 480 nm.

While the specific examples in FIGS. 2A and 2B are described in terms of PS colloidal particles and gold nanoparticles, numerous other types of materials can be utilized. For example, in certain embodiments, silica particles, poly methyl methacrylate particles (PMMA), other acrylate, alkylacrylate, substituted alkylacrylate, crosslinked PS or PMMA particles or poly(divinylbenzene) particles can be utilized as the sacrificial particles. Other polymers of different architectures, random and block copolymers, branched, star and dendritic polymers, supramolecular polymers, and the like can be utilized as the sacrificial particles. Sizes of these sacrificial particles may range from about 50 nm to about several tens or hundreds of microns. Some exemplary sizes include 100 nm to about 1000 nm to provide either specific optical properties or improved assembly characteristics that are not largely affected by gravity. In certain embodiments, the size may range from about 100 nm to about 500 nm. As will be apparent to one of skill in the art, other sacrificial particles can also be utilized.

In certain embodiments, the nanoparticles can include metal (e.g., gold, silver, platinum, palladium, ruthenium, rhodium, cobalt, iron, nickel, osmium, iridium, rhenium, copper, chromium, bimetals, metal alloys, and the like and combinations thereof) nanoparticles, semiconductor (e.g., silicon, germanium, and the like, pure or doped with elements or compounds of group III or V elements, and combinations thereof) nanoparticles, metal oxide (e.g., $V_2O_5$, silica, alumina, noble metal oxides, platinum group metal oxides, titania, zirconia, hafnia, molybdenum oxides, tungsten oxides, rhenium oxides, tantalum oxide, niobium oxide, chromium oxides, scandium, yttrium, lanthanum and rare earth oxides, thorium and uranium oxides and the like) nanoparticles, metal sulfide nanoparticles, or combinations thereof.

In certain embodiments, selection of the desired nanoparticles can be based on providing certain desired properties. For example, Pd or Pt, other noble metal or metal oxide particles can provide catalytic properties, while Ag, copper or oxide (e.g., $V_2O_5$) nanoparticles can provide antibacterial properties. Other nanoparticles, such as semiconductor nanoparticles for semiconducting properties, magnetic nanoparticles for magnetic properties, and/or quantum dots for optical properties, can be utilized as desired.

In certain embodiments, more than one different type of nanoparticles can be provided onto the colloidal particles. For instance, both Pd and Pt (or any other binary, tertiary or higher order desired combination of catalytically active metals) nanoparticles can be provided to provide different catalytic properties to different reactants. Such nanomaterial modified colloidal particles can be formed by reacting the colloidal particles with a mixture of first (e.g., Pd) and second (e.g., Pt), as well as any additional nanoparticles or their precursors. Alternatively, such nanomaterial modified colloidal particles can be formed by sequentially reacting colloidal particles with a first type of nanoparticles or their precursors followed reaction with a second type of nanoparticles or their precursors. Many different ways to provide such multiple functionality would be readily evident to one skilled in the art.

Figure 3:
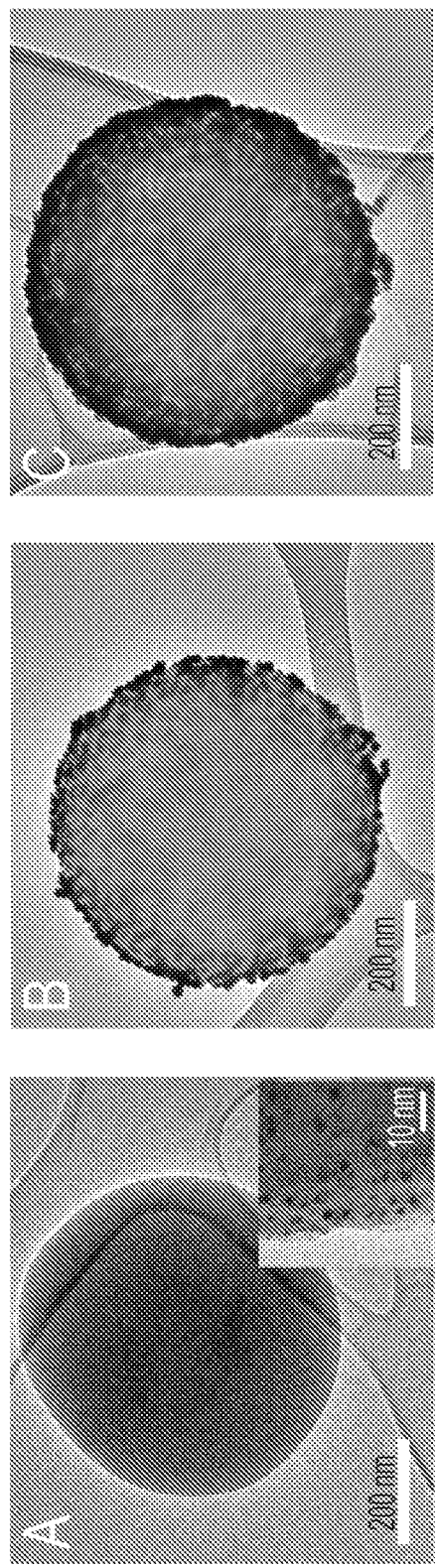
FIG. 3A-3C shows images of colloidal particles decorated with different sized metal nanoparticles in accordance with certain embodiments.

In certain embodiments, as shown in FIG. 1, the amount and/or size of the nanoparticles can be optionally further increased after attachment to the sacrificial particles. In certain embodiments, the nanoparticles can be grown further in size through the addition of a growth solution. In certain embodiments, the growth solution can be provided so that a shell (or nearly complete shell) forms around the sacrificial particles. For example, FIG. 3 shows TEM images of gold nanoparticle decorated PS colloidal particles having an average diameter of about 480 nm. In these illustrative examples, after decorating the PS colloids with small gold nanoparticles (np) having diameter of ~2 nm using the same method described on FIG. 2A, the size of the gold nanoparticles were increased by introducing the gold nanoparticle growth solution. FIG. 3A shows the gold nanoparticles are about 2 nm in diameter. When growth solution is applied after attachment to the colloidal particle, the diameter of the gold nanoparticles increases gradually, as shown in FIGS. 3B and 3C, also resulting in a more densely covered surface or a shell on the surface.

In certain embodiments, as shown in FIG. 1, additional functionality can be provided to the nanoparticle-modified sacrificial particles as desired. For example, it may be desirable to improve the stability of the nanoparticle-modified sacrificial particles in suspension and/or with the final backfilled material (as will be described in greater detail below) or to introduce additional functionality. For example, the nanoparticle-modified sacrificial particles can be coated with a material that is more compatible with the final backfilled interconnected solid material. Specific examples include coating the nanoparticles with silica if the final backfilled interconnected solid material will be titania or alumina. Another specific example includes coating the nanoparticles with titania or alumina if the backfilled interconnected solid material is formed using a silica sol-gel chemistry. Yet another specific example includes providing chemical functionalization to provide silane groups on the nanoparticles to promote condensation with metal oxide sol-gel chemistries. Numerous other examples will be readily apparent to one skilled in the art.

In certain embodiments, although many differently sized nanoparticles can be utilized, such as 1 nm to several tens of nm, the nanoparticles and/or the shell that forms around the sacrificial particles are less than about 7.75% of the characteristic size (e.g., diameter, longest dimension, shortest dimension, etc.) of the sacrificial particle. For example, the nanoparticles and/or the shell that forms around the sacrificial particles are less than 31 nm in the case of sacrificial particles of the size of 400 nm as shown in the Figures. In certain embodiments, the nanoparticles and/or the shell that forms around the sacrificial particles are less than 5%, 2%, or 1% of the sacrificial particle diameter. In certain embodiments, the nanoparticles and/or the shell that forms around the sacrificial particles are less than 100, 40, 20, 15 or 10 nm. In certain embodiments, the nanoparticles and/or the shell that forms around the sacrificial particles are less than about 20 nm, less than about 15 nm, or less than about 10 nm. In certain embodiments, the nanoparticles and/or the shell that forms around the sacrificial particles are less than about 5 nm or less than about 2 nm or less than about 1 nm in size. In certain embodiments, the nanoparticles and/or the shell that forms around the sacrificial particles are between about 1 nm to about 100 nm. In certain embodiments, nanoparticles that form around the sacrificial particles are less than 15 nm. In certain embodiments, the shell that forms around the sacricifical particles have a thickness that is smaller than 20, 15, or 10 nm. Generally, whether nanoparticles or a shell is attached to the sacrificial particles, these structures will be referred to as "nanomaterial modified sacrificial particles."

Then, as shown in FIG. 1, the nanomaterial modified sacrificial particles can be utilized for the formation of an assembly, such as an opal structure. In certain embodiments, the nanomaterial modified sacrificial particles can be arranged into a desired assembly having an interconnected interstitial space of pores between the nanomaterial modified sacrificial particles. In certain embodiments, such an assembly may have a crystalline structure (e.g., opal structure), glassy structure (e.g., glass-like short range order) or be completely disordered (e.g., no short or long range order).

The schematic in FIG. 2C provides one illustrative example of using a gold modified PS colloids using a two phase self-assembly process in the presence of the silica precursor $Si(OEt)_4$. However, many different techniques to provide an assembly can be utilized, such as self assembly of composite colloids from solution, drop casting, spin coating, microfluidic device, emulsion templating, spray coating, spray drying, induced aggregation in solution or engineering techniques as grinding or milling of preformed powder, infiltration of sol-gel material or atomic layer deposition (ALD).

Thereafter, as shown in FIG. 1, such an assembly can be then backfilled with a material that can backfill the interstitial spaces between the nanomaterial modified sacrificial particles. In other embodiments, the assembly can be formed in conjunction with a material that can backfill the interstitial spaces between the nanomaterial modified sacrificial particles, as in so-called co-assembly method shown in FIG. 2C. FIG. 2C again shows a particular example, where the nanoparticles-modified sacrificial colloids assemble into an opal structure in the presence of the matrix material (e.g., sol-gel solution of a metal oxide or silica) that fills interstitial spaces between the nanoparticle-modified colloidal nanoparticles to form an inverse opal structure after the removal of the sacrificial particles by heat treatment.

As shown in FIG. 1, the sacrificial particles can be removed leaving an interconnected porous network structure having nanoparticles preferentially located at the air/network interface. FIG. 2C provides one illustrative example where the formation of the opal structure and backfilling described above is followed by calcination at 500° C. to produce inverse opals with gold nanoparticles present predominantly at the interface of the interconnected solid material and the interconnected pores (i.e., the region where the colloidal particles used to be). However, depending on the type of sacrificial particles and the solid material to be formed for the interconnected porous network structure, many different temperatures can be utilized. For example, if a polystyrene is used as the sacrificial material and silica is used as the interconnected solid network structure, use of a temperature that exceeds the temperature of complete decomposition of the sacrificial particles (e.g., 400° C.) but below the decomposition temperature of the solid matrix material ($SiO_2$) temperature may be carried out. In this case, the temperature to remove the sacrificial particles may, for example, be 500° C.

There is no limitation on the type of solid materials that can be utilized for the interconnected porous network structure. In certain embodiments, the interconnected porous network structure can include silica, titania, alumina, zirconia, other oxides (e.g., inorganic sol-gel derived oxides, mixed oxides), polymers of different architectures, random and block copolymers, branched, star and dendritic polymers, supramolecular polymers, metals and combinations thereof. For instance, combination of silica precursor with polymer to produce mesoporous silica matrix with enhanced porosity. In certain embodiments, precursors that react, solidify or polymerize to form the solid material can be utilized. Other techniques that will be readily apparent to one skilled in the art, such as electroplating, can be utilized as well.

In certain embodiments, selection of the material for the interconnected network structure can be based on any desired properties. For example, use of titania or zirconia can provide certain desired photocatalytic and/or electrical properties. The use of polymers as matrix material may result in soft and dynamic network structures.

While not wishing to be bound by theory, the presence of nanoparticles (e.g., gold metal nanoparticles) or nanoshell (e.g., gold shell that was grown after gold metal nanoparticle attachment) on the surfaces of the sacrificial particles (e.g., polystyrene) are expected to prevent formation of an interconnected structure between the sacrificial particles (e.g., polystyrene portions do not touch each other). In this case, one skilled in the art would not have expected to be able to remove the sacrificial particles in the presence of the backfilled material as there is a lack of an interconnected pathway between the sacrificial particles to allow sufficient removal of the sacrificial particles. Nevertheless, it has been unexpectedly found that by utilizing sufficiently small nanoparticles or nanoshells, despite the fact that the sacrificial particles themselves may not be touching each other, removal of the sacrificial particles was possible and resulted in interconnected pores.

Moreover, another unexpected result is that when the sacrificial particles are being removed, the nanoparticles or the nanoshell (if grown) are able to transfer themselves onto the solid material without being removed along with the sacrificial particles so that they remain predominantly on the surface of the interconnected solid material (i.e., at the interface between the interconnected solid material and the interconnected pores). Furthermore, the nanoparticles do not agglomerate with each other during this removal step of the sacrificial particles and generally remain well distributed throughout the interconnected porous network structure.

Figure 4:
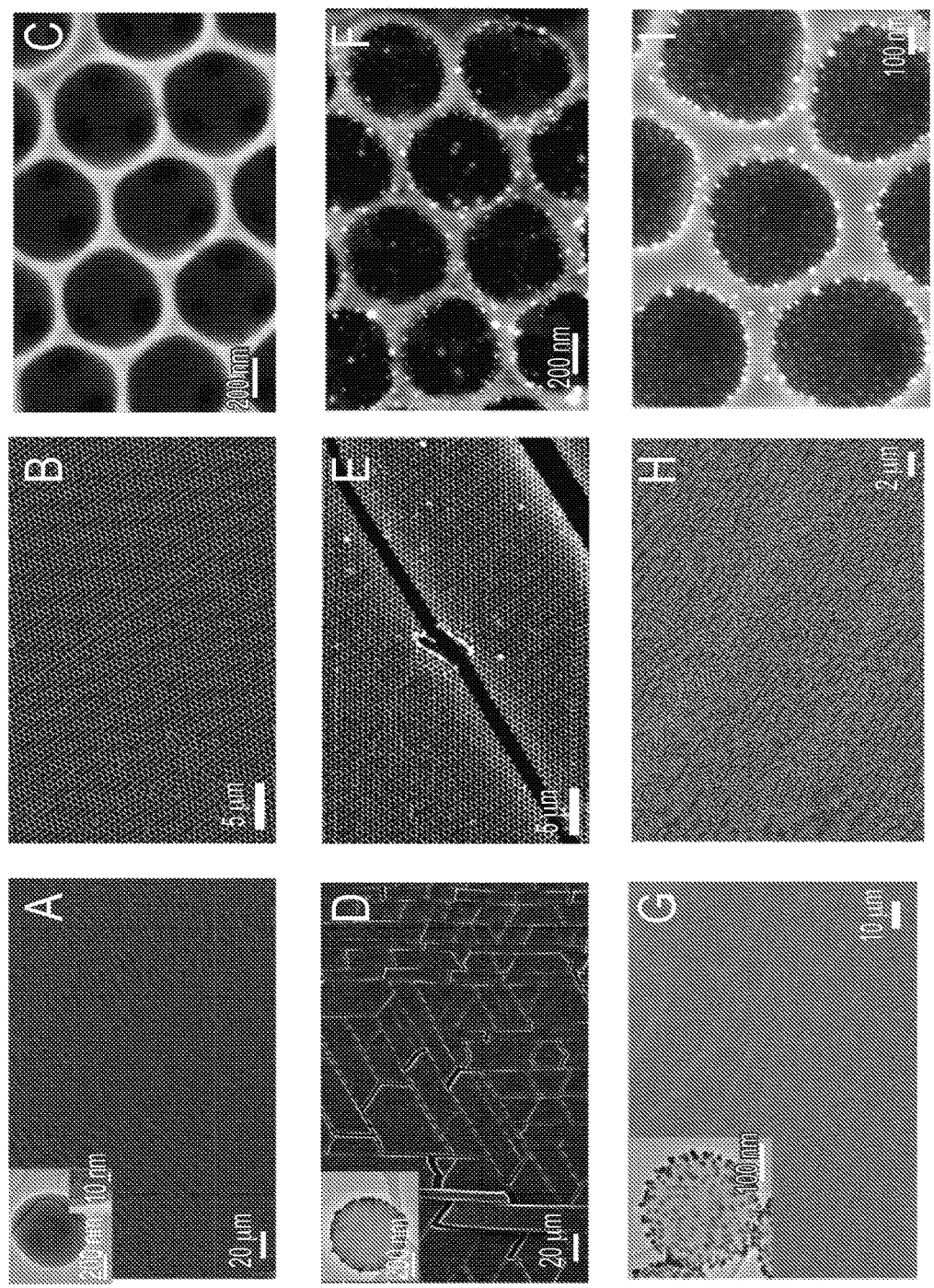
FIG. 4A-4I demonstrates the varying degree of long range ordering that can be obtained depending on the size of nanoparticles in accordance with certain embodiments.

Moreover, FIG. 4 shows the formation of an ordered inverse opal interconnected porous network structure using various composite PS colloids shown in FIGS. 2B and 3A-3C. FIGS. 4A through 4C show an ordered inverse opal structure when PS colloids modified with small AuNPs (Au seeds) of less than 5 nm in diameter have been used (see FIG. 3A). The crystalline order of the inverse opal is visible by the presence of Moiré fringes (these are the lines one can see) that indicate periodic arrangements of the individual colloids that are too small to be resolved in the image. In certain embodiments, a long range ordered inverse opal structures, with reduced number of defects is highly desirable. For example, long range ordered inverse opal structure provides well-ordered structures that span at least 100 microns, at least 1 mm, or even at least 1 cm, without significant amount of defects, such as cracks and the like. Without wishing to be bound by theory, there may be certain processing parameters that allow the formation of long-range ordered inverse opal structures while other conditions lead to structures having a greater degree of defects and/or disorder. For instance, long range ordered inverse opal structures may be obtained by utilizing PS colloidal particles that have been modified with small metal nanoparticles, such as nanoparticles less than 5 nm, less than 3 nm, or even less than 2 nm in diameter.

In contrast, using larger nanomaterial modified colloidal particles leads to less ordered structures. FIG. 4D-F shows the formation of an interconnected porous network structure using PS colloids modified with nanoparticles depicted on FIG. 3B having a size of about 450 nm. FIG. 4G-I shows inverse opal structures made using PS colloids modified with gold nanoparticles having ~12 nm in diameter. Furthermore, the additional growth of gold shell around the PS colloid (as shown in FIG. 3C) resulted in the less stable colloidal dispersion giving rise to colloidal precipitation after ~3-4 h.

Nevertheless, despite the reduced order, differently sized nanoparticles (or different amounts of the functional material) can form an interconnected porous network structure having a precise placement of the functional material at the interface of solid material and the pore.

Figure 5:
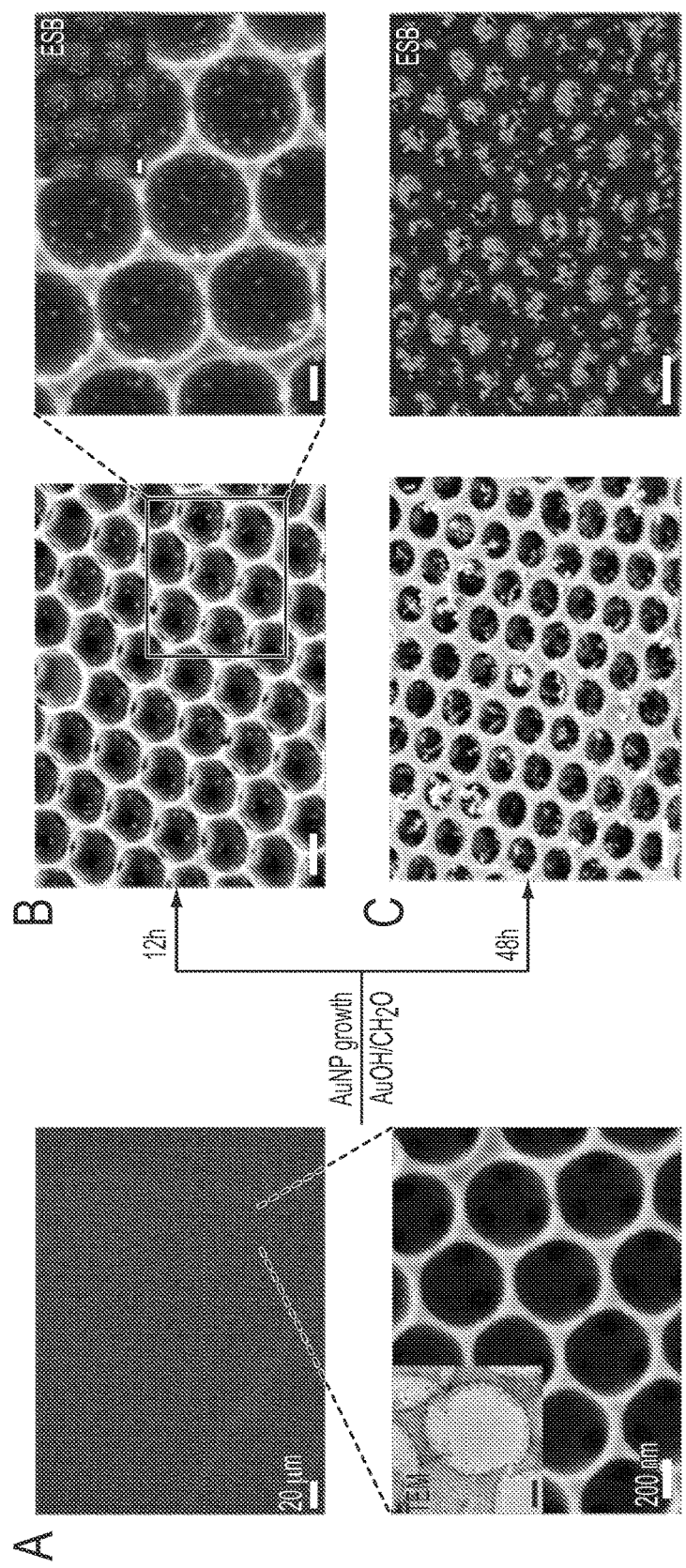
FIG. 5A-5C shows the growth of metal nanoparticles that reside at the air/solid interface of the interconnected porous structure in accordance with certain embodiments.

In certain embodiments, the amount of functional material present at the air/network interface can be further increased after the formation of an interconnected porous network structure. As shown in FIG. 3, a nanoparticle growth solution can be introduced through the interconnected pores of the interconnected porous network structure, thereby forming a shell of the desired functional material. The illustrative example shown in FIG. 5 introduced a AuOH/CH$_2$O solution into an inverse opal structure having gold nanoparticles at the air/inverse opal interface to form a gold shell at the air/inverse opal interface.

FIG. 5A shows an SEM image of inverse opals made from gold seed-modified PS colloids. FIG. 5B shows an SEM image of the same sample after 12 h immersion in a gold salt solution. Similarly, FIG. 5C shows an SEM image of the same sample after 48 h immersion in a gold salt solution. As shown, the presence of the gold at air/solid interface increases over time, as evidenced by the higher signal arising from the higher electron density of gold especially in backscattered electron imaging (images labeled ESB).

The current approaches described herein provide superior benefits over previous approaches. The precise placement of functional material at air/matrix interface increases their accessibility for desired reactions (e.g. catalysis) and makes the resulted composite porous structures highly efficient using high degree of morphological control. For example, the high number of metal nanoparticles present at the air/solid interface may allow one to formulate a relatively uniform shell around the air/solid interface.

Accordingly, the present disclosure provides a synthetic approach to obtain precise confinement of nanoparticles on interfaces of interconnected porous network structures, such as inverse opal structure surface, that have short or long range ordering. In certain embodiments, the network structure may even be a disordered structure. Such a structure allows the formation of highly efficient porous functional materials with controlled reactivity, in addition to the tailoring of the network structure's optical properties through the presence of an absorbing component. In addition, the accessibility of gold nanoparticles at the air/network interface permits further growth of nanoparticles at defined positions of the inverse opal structure. This method provides a high level of synthetic flexibility and permits remarkable control over the structural parameters of composite particles leading to the formation of novel types of "heterocomposite" (multicomposite) inverse opal structures with well-defined morphology, composition and structure-property relationships.

The potential use of such hybrid, porous network structures with surface accessible functional nanoparticles may extend into various applications including optics (photonic crystals), heterogeneous catalysis and bio-catalysis, sensing, surface enhanced Raman scattering applications, photocatalysis, electrode materials, enhancement of solar cell performance and others.

Many different modifications are within the skill of one skilled in the art. In certain embodiments, once the interconnected porous network structure having the desired nanoparticles or nanoshells located at the air/network structure interface is formed, further modification can be carried out to provide desired properties, such as molecular complexes for catalysis, stimuli responsive molecules for sensing, and the like. Desired functional groups that provide desired functionalities can be provided thereon.

In other embodiments, the interconnected porous network structures described herein can be formed in a variety of different shapes, depending on desired applications. For example, the structures can be formed in the form of films, shards (e.g., flakes, debris), spherical assemblies and powders.

In certain embodiments, the degree of porosity can be increased. In certain embodiments, binary or higher order mixtures of particles can be utilized. In certain embodiments, mesoporous materials can be utilized as the matrix materials.

Figure 6:
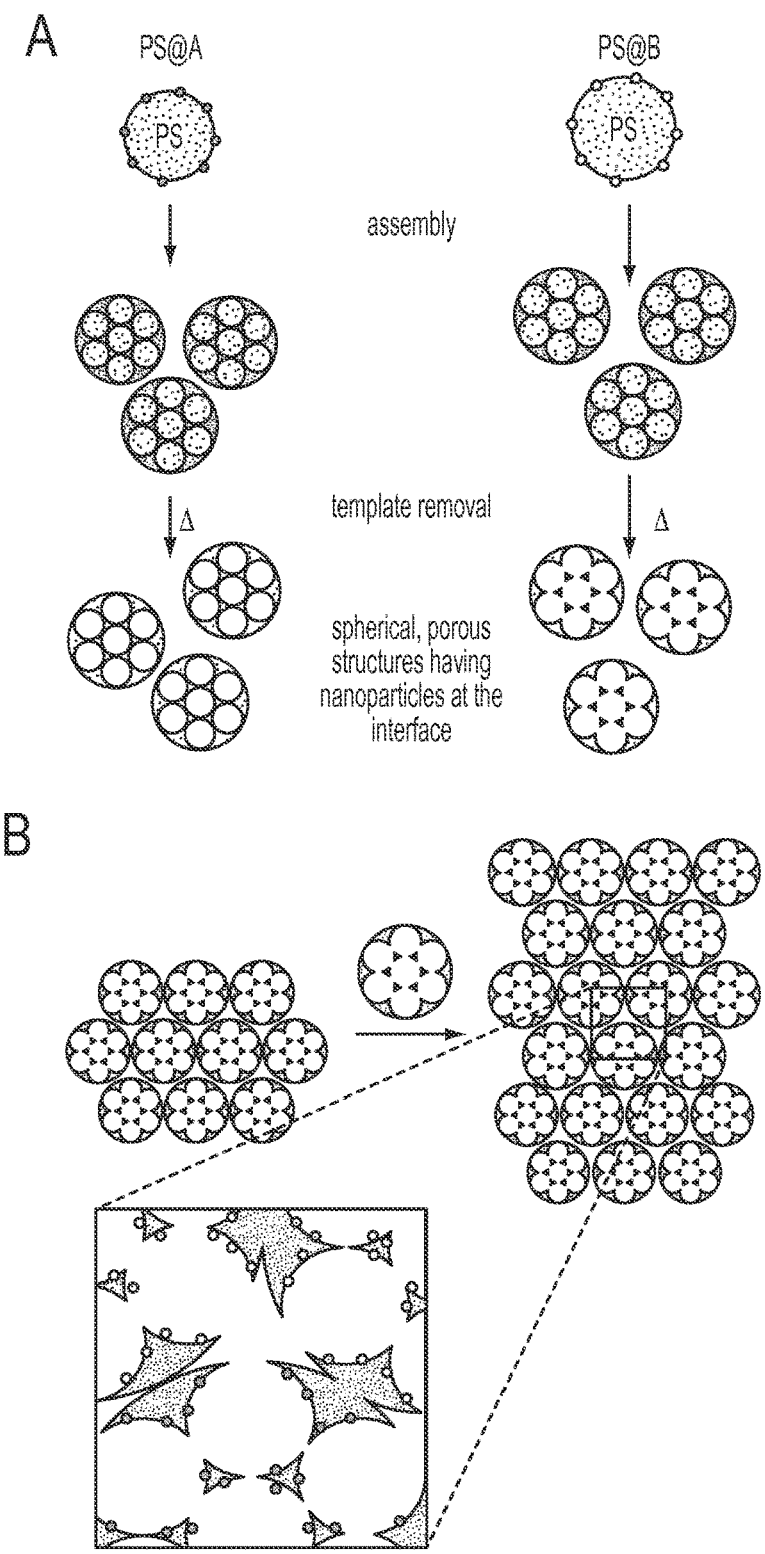
FIG. 6A-6B is a schematic illustration showing a method to form hierarchical interconnected porous network structure having two different nanoparticles residing only at the air/solid interface in accordance with certain embodiments.

In some other embodiments, as shown in FIG. 6, hierarchical materials can be prepared by creating superstructures of the interconnected porous network structure with dimensions in the micrometer range. As an example, FIG. 6A shows emulsion templating of a nanomaterial modified colloidal dispersion in the presence of the backfilling material can be used to create spherical superstructures of the interconnected porous network structure. In certain embodiments, superstructures can be formed that contain different types of nanoparticles (e.g., "PS@A" and "PS@B"). Then, these micron scale superstructure units can be further assembled into a crystal or a disordered arrangement, either using one type or multiple types of superstructures having different nanoparticles. For example, as shown in FIG. 6B, multicomponent systems can be created that have different functional nanoparticles at different places of architecture. This can allow multiple catalytic processes within one unit. Moreover, as a result, a hierarchical, porous material results that has voids over multiple length scales, ranging from the initial pores to the voids arising from the assembly of the micron-scale porous elements which may allow better diffusion or better flow of liquids (i.e. less clogging).

Upon review of the description and embodiments provided herein, those skilled in the art will understand that modifications and equivalent substitutions may be performed in carrying out the invention without departing from the essence of the invention. Thus, the invention is not meant to be limiting by the embodiments described explicitly above.

What is claimed is:

1. An interconnected porous network structure comprising:
    an interconnected network of solid material defining an interconnected network of pores, wherein the interconnected solid material has an inverse opal structure; and
    nanoparticles residing at defined positions of an interface between the network of pores and said interconnected network of solid material defining the interconnected network of pores.

2. The interconnected porous network structure of claim 1, wherein said nanoparticles are selected form the group consisting of metal nanoparticles, semiconductor nanoparticles, metal oxide nanoparticles, mixed metal oxide nanoparticles, metal sulfide nanoparticles, metal chalcogenide nanoparticles, metal nitride nanoparticles, metal pnictide nanoparticles and combinations thereof.

3. The interconnected porous network structure of claim 1, wherein said nanoparticles are selected from the group consisting of gold, palladium, platinum, silver, copper, rhodium, ruthenium, rhenium, osmium, iridium, iron, cobalt, nickel, bimetals, metal alloys, and combinations thereof.

4. The interconnected porous network structure of claim 1, wherein said nanoparticles are selected from the group consisting of silicon, germanium, tin, silicon doped with group III or V elements, germanium doped with group III or V elements, tin doped with group III or V elements, and combinations thereof.

5. The interconnected porous network structure of claim 1, wherein said nanoparticles comprise catalysts for chemical reactions.

6. The interconnected porous network structure of claim 1, wherein said nanoparticles are selected from the group consisting of silica, alumina, beryllia, noble metal oxides, platinum group metal oxides, titania, zirconia, hafnia, molybdenum oxides, tungsten oxides, rhenium oxides, tantalum oxide, niobium oxide, chromium oxides, scandium, yttrium, lanthanum, ceria, and rare earth oxides, thorium and uranium oxides and combinations thereof.

7. The interconnected porous network structure of claim 1, wherein said nanoparticles are grown in size up to and including to form a continuous shell residing predominantly at the interface between said network of solid material and said network of pores.

8. The interconnected porous network structure of claim 1, wherein said nanoparticles are selected form the group consisting of metal nanoparticles, semiconductor nanoparticles, metal oxide nanoparticles, mixed metal oxide nanoparticles, metal sulfide nanoparticles, metal chalcogenide nanoparticles, metal nitride nanoparticles, metal pnictide nanoparticles and combinations thereof; and wherein the solid material is selected from the group consisting of silica, titania, alumina, zirconia, hafnia, inorganic sol-gel derived oxides, polymers, random copolymers, block copolymers, branched polymers, star polymers, dendritic polymers, supramolecular polymers, metals and combinations thereof.

* * * * *